Patented Oct. 27, 1925.

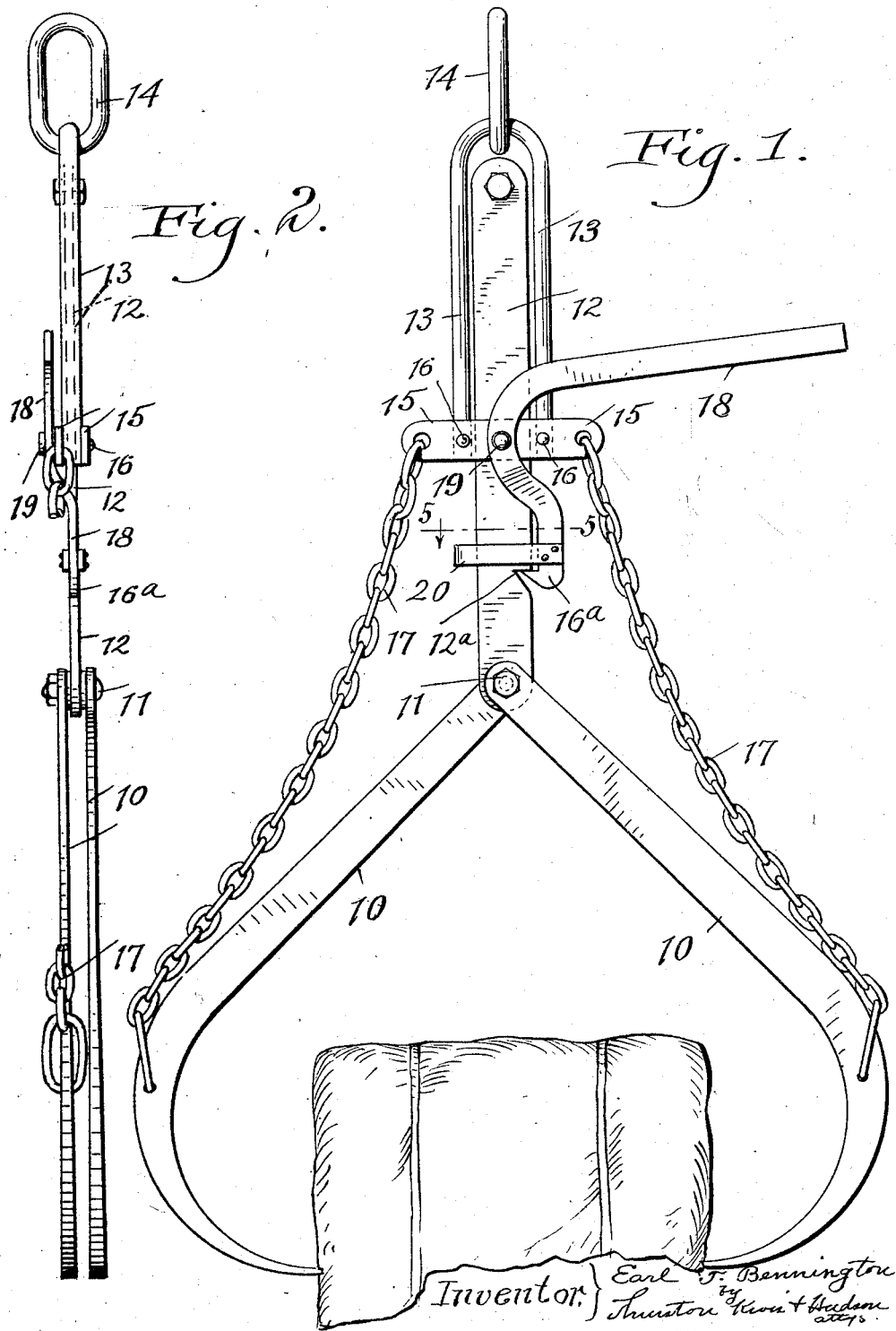

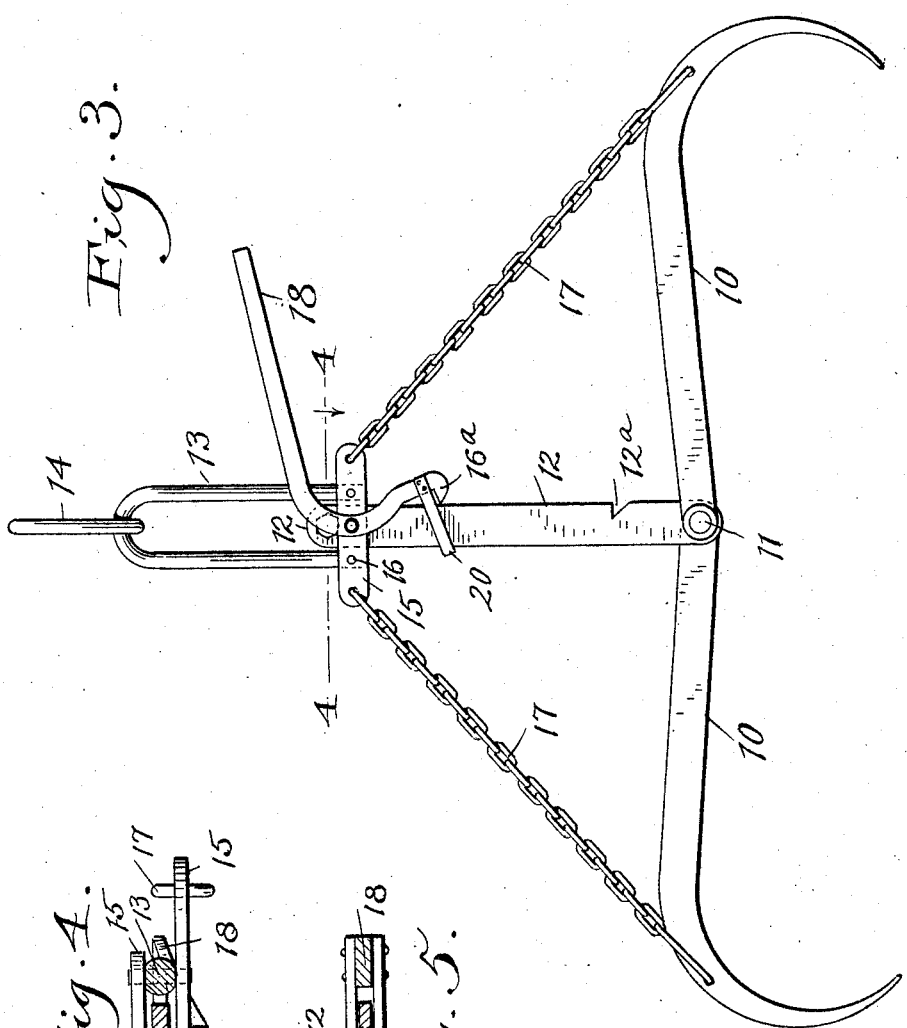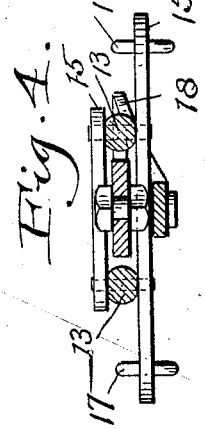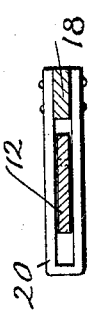

1,558,778

UNITED STATES PATENT OFFICE.

EARL T. BENNINGTON, OF CLEVELAND, OHIO, ASSIGNOR TO THE CLEVELAND CRANE & ENGINEERING COMPANY, OF WICKLIFFE, OHIO, A CORPORATION OF OHIO.

GRAB.

Application filed February 6, 1922. Serial No. 534,316.

*To all whom it may concern:*

Be it known that I, EARL T. BENNINGTON, a citizen of the United States, residing at Cleveland, in the county of Cuyahoga and State of Ohio, have invented a certain new and useful Improvement in Grabs, of which the following is a full, clear, and exact description.

This invention relates to a grab for supporting and conveying articles such as cotton bales.

The principal object of the invention is to provide a grab of the type wherein the hooks or tongs are designed to be spread to release the load by trip mechanism, which grab is simple in construction and effective in operation, particularly in the latching or cocking of the device and in tripping it.

The invention may be briefly summarized as consisting in certain novel details of construction, and combinations and arrangements of parts which will be described in the specification and pointed out in the appended claims.

In the accompanying sheet of drawings, Fig. 1 is a side view of my improved grab showing the same in position for holding and conveying the load; Fig. 2 is an edge view of the same; Fig. 3 is a side view after the device has been tripped and the hooks spread to release the load; Fig. 4 is a section on the line 4—4 of Fig. 3 on an enlarged scale; and Fig. 5 is a section on the line 5—5 of Fig. 1, also on an enlarged scale.

Referring now to the drawings, the load is adapted to be grabbed by a pair of tongs or hooks 10, which at their upper ends are pivotally connected by a bolt 11 to the lower end of a vertically movable bar 12. This bar is adapted to slide within a U-shaped piece or yoke 13, to the top of which is adapted to be connected a chain 14 or equivalent means by which the grab is designed to be attached to a carrier adapted to travel along a suitable trackway.

At the bottom of the yoke 13 the bar 12 is guided between a pair of transverse straps 15, between which the lower free ends of the yoke are secured by rivets or equivalent means 16. One of the straps 15 projects laterally from both sides of the bottom of the yoke 13, and to the outer free ends of this strap are connected chains or equivalent flexible members 17, which at their lower ends are connected to the hooks 10 at points such that when the bar 12 is unlatched or tripped, the pull on these chains will automatically spread the hooks so as to release the load, the bar 12 and yoke 13 forming an extensible and contractible head for supporting the hooks.

The bar 12 is designed to be latched or cocked and held in elevated position with respect to the yoke 13 by a latch 18 which is pivotally connected at 19 to one of the transverse straps 15. This latch is so shaped as to provide a laterally projecting handle portion, the weight of which tends to hold the latching end of the latch in engagement with the bar. Additionally this latch is so formed as to provide below the pivot a downwardly extending portion at the free end of which is a shoulder or latching hook $16^a$ which is designed to engage under a shoulder $12^a$ of the bar 12.

It is desirable that the lower end of the latch and the bar 12 be held in such relative positions that the hook $16^a$ at the bottom of the latch will be in the plane of the bar so as to insure latching when the bar is elevated, and to that end the latch 18 is provided with a laterally projecting guide loop 20 through which the bar 12 slides, the slides of the loop being spaced just far enough apart to receive the bar 12 and to permit it to move up and down without permitting the bar to move laterally with respect to the hook at the bottom of the latch.

In operation, assuming that a cotton bale is to be picked up and conveyed, the operator slides the bar upward until it is latched. The latching takes place automatically when the bar is elevated to a point such that the shoulder $12^a$ of the bar is just above the hook of the latch, since, as above stated, the weight of the handle portion of the latch tends to move the latch hook inward.

When the bar has been latched, the hooks are supported independently of the chains 17, in which event the hooks can be spread or brought together and caused to be sunk into the bale. Then when the bale is allowed to be supported by the hooks as by removing a support such as a truck from beneath the bale, or by elevating the grab, the hooks will remain in supporting position so that the bale can be conveyed to any desired point.

To release the bale, the operator has only to elevate the handle portion of the latch, whereupon the bar 12 slides downward until shoulders provided on the bar near the top thereof engage or rest upon the straps 15. Preferably these shoulders are formed by the head and nut of a short bolt extended transversely through the upper part of the bar. When the bar descends the load is transfererd to the chains 17, and when this occurs the load pulls the hooks outward to releasing position.

It will be seen that simplicity and cheapness of construction are attained to the highest degree, and notwithstanding this, the grab is effective and reliable in its latching, supporting and releasing functions, and also possesses the feature of durability.

Having described my invention, I claim:

1. In a grab of the character described, an extensible and contractible head including two relatively movable members, one comprising a vertically slidable bar, and the other adapted to be connected to a hoist and having a gravity actuated latch pivotally suspended therefrom which is adapted to engage the bar to latch the parts in relatively shortened position, said latch having a laterally extending handle portion, the weight of which serves to hold the latch in engagement with the bar and by which the latch may be manually operated, grab hooks connected to the lower end of the bar, and flexible members connecting the hooks to said other member of the head.

2. In a grab of the character described, an extensible and contractible head composed of two relatively movable members, one in the form of a bar, and a second slidingly receiving the bar, said second member carrying a latch which is provided beneath said member with a guide for the bar, and a pair of hooks supported from the lower end of the bar and connected to said second member.

3. In a grab of the character described, an extensible and contractible head composed of two relatively movable members, one in the form of a bar, and a second slidingly receiving the bar, said second member carrying a latch which is provided beneath said member with a guide for the bar, and a pair of hooks supported from the lower end of the bar and connected to said second member, said latch having a gravity actuated laterally extending handle portion and a lower bar engaging latching portion.

4. In a grab of the character described, an extensible and contractible head comprising a bar having a pair of hooks pivotally connected to the lower end thereof, a second member comprising a supporting yoke and carrying a guide for the bar, and a latch carried by the yoke for holding the bar elevated, said latch having a guide portion engaging the bar.

5. In a grab of the character described, an extensible and contractible head comprsing a vertically movable bar having a pair of hooks pivotally attached to the lower end thereof, an inverted U-shaped grab supporting member provided at the lower end thereof with transversely extending means forming a guide for the bar and carrying a latch adapted to engage the bar to hold the same elevated, said latch being pivoted to said guide and having at its lower end a hook engageable with the bar and its upper end forming a laterally projecting handle by which the latch may be manually operated, said handle also forming a counterweight for holding the latch in engaging position.

6. In a grab of the character described, an extensible and contractible head comprising a vertically movable bar having a pair of hooks attached to the lower end thereof, and comprising also an inverted U-shaped member provided at the lower end thereof with transversely extending means forming a guide for the bar and carying a latch member adapted to engage the bar and to hold the same elevated, said latch being pivoted intermediate its ends to said guide, the lower end of the latch member having a hook engagable with the bar, and a guide loop surrounding the bar, and the upper end of the latch member being in the form of a laterally extending handle.

In testimony whereof, I hereunto affix my signature.

EARL T. BENNINGTON.